UNITED STATES PATENT OFFICE.

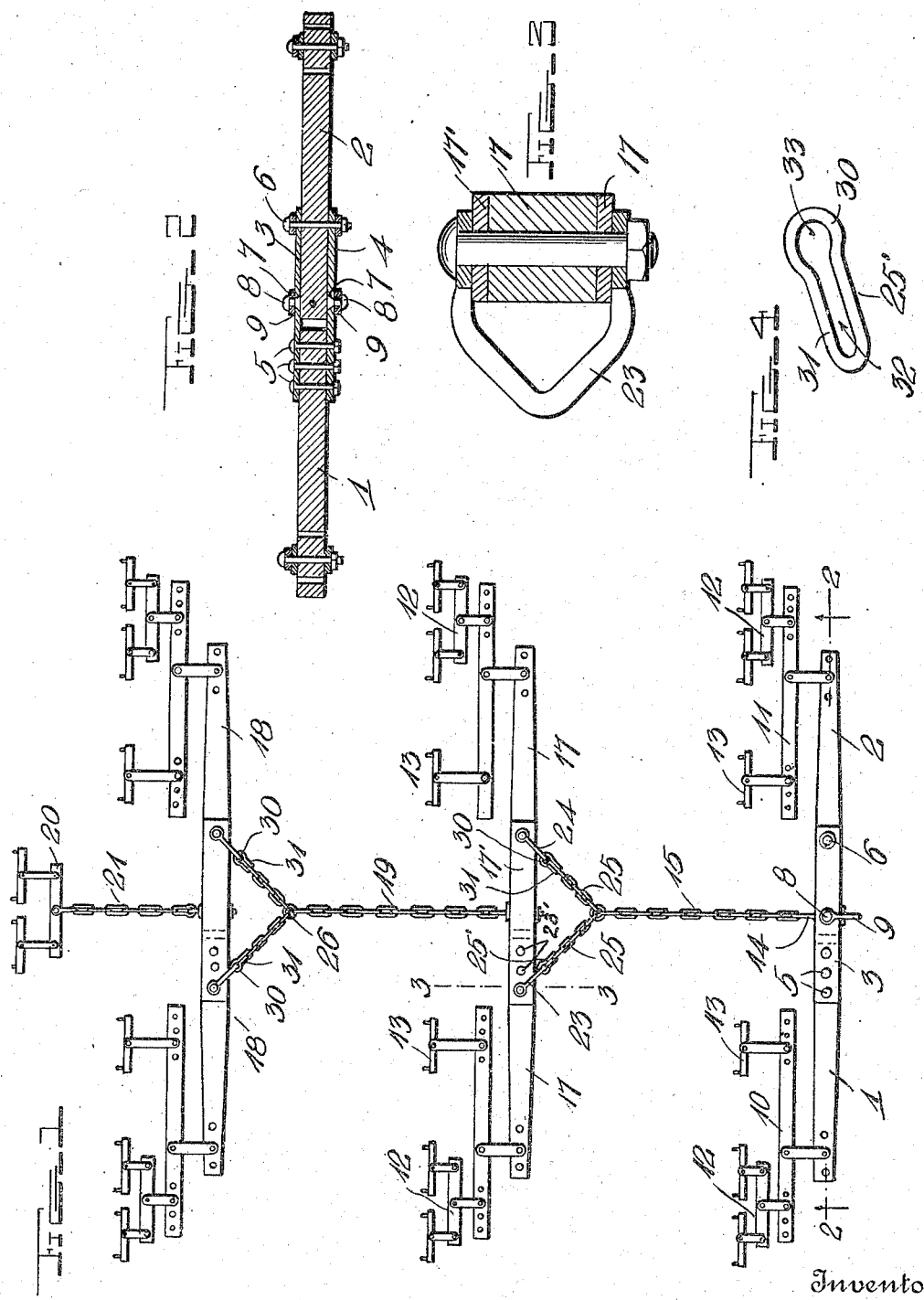

JENNINGS VAN MATRE, OF PASO ROBLES, CALIFORNIA.

DRAFT-EQUALIZER.

957,821.   Specification of Letters Patent.   Patented May 10, 1910.

Application filed July 27, 1908. Serial No. 445,514.

*To all whom it may concern:*

Be it known that I, JENNINGS VAN MATRE, a citizen of the United States, residing at Paso Robles, in the county of San Luis Obispo and State of California, have invented certain new and useful Improvements in Draft-Equalizers; and I do declare the following to be a full, clear, and exact description of the invention, such as will enable others skilled in the art to which it appertains to make and use the same.

My invention relates to draft equalizers, and is particularly directed to improvements of that type shown in my co-pending application, Serial Number 434,836, filed May 25, 1908, and also to improvements in the structure shown in my patent granted Feb. 4, 1908, Number 887,027.

The object of the invention is to provide an equalizer by which the draft will be equally distributed between the animals, and which will be cheap and efficient in operation.

With these and other objects in view, the invention consists of certain novel features of construction, combination and arrangement of parts, as will be more fully described and particularly pointed out in the appended claim.

In the accompanying drawings, Figure 1 is a top plan view of my invention; Fig. 2 is a vertical section on the line 2—2 of Fig. 1; Fig. 3 is a sectional view on the line 3—3 of Fig. 1; Fig. 4 is a view of the link 25'.

Referring more especially to the drawings, 1 and 2 represent the left and right hand sides of the rear evener beam, which are connected together by a pair of plates 3 and 4, which are securely bolted to the end 1 by bolts 5 and which overlap a portion of the evener member 2. The over-lapping portions of the plates 3 and 4 are apertured to receive the pivotal bolt 6, which passes through the evener member 2 and are also apertured at 7 to receive the clevis bolt 8, which pivotally secures the clevis 9 to the plates. To the outer end of both levers are connected the whiffle-trees 10 and 11, to which are secured in the usual manner the double and swingle-trees 12 and 13 respectively. The inner end of the evener member 2 of the evener is provided with a clevis 14, to which is connected a chain 15 with branches 25 secured by clevises 23 and 24 to a duplicate evener 17. A similar arrangement is followed by connecting the triplicate evener 18 to the evener 17 by a chain 19. Ahead of all the equalizers or eveners I provide a double-tree 20, which is secured to the evener 18 by a chain 21.

The bar 17 is provided with the bearing plate 17', a similar plate being secured below the bar 17, having the openings 23' for the longitudinal adjustment of the clevis 23. Disposed on the clevises 23 and 24 are links 25' each of which comprises a circular portion 30 and a straight portion 31, forming an opening therein of keyhole shape, the elongated slot portion 32 receiving one of the links 25 and the circular opening 33 forming a bearing for the clevis, said longitudinal slot 32 and circular opening 33 registering with each other. The chains 25 are suitably connected at their inner ends by a ring 26.

Having thus described my invention, what I claim and desire to secure by Letters Patent is:—

A draft equalizer comprising a primary sectional evener bar with a plurality of apertures in the inner end of one section and a single aperture in the inner end of the other section, plates mounted on the upper and lower surfaces of said first named section of the bar and having the same number of apertures as the bar and registering therewith, a plurality of bolts inserted in the plurality of apertures of the plates and section of bar, a bolt inserted through the plate and single aperture of the other section, a similar secondary sectional evener bar having a clevis adapted to be interchangeable from one of the plurality of bolts to the other, a clevis carried by the pivot of the sections, links having circular and straight portions, the straight portions having slots which communicate with the circular portions, the circular portions being secured to the clevises, and chains having their inner ends secured to the slotted portions, the outer ends of the chains having a ring secured thereto, and an intermediate chain secured to said ring and extending rearwardly and connected to the primary evener bar, a third similar evener bar similarly connected to the second evener bar, a forward double tree connected to the third evener bar, and draft devices on the outer ends of the first, second and third evener bars, substantially as specified.

In testimony whereof I have hereunto set my hand in presence of two subscribing witnesses.

JENNINGS VAN MATRE.

Witnesses:
    FRANK BARBA,
    RICHARD AROUJO.